(12) United States Patent
Tenhunen

(10) Patent No.: US 7,398,316 B2
(45) Date of Patent: Jul. 8, 2008

(54) METHOD AND APPARATUS FOR KEYHOLE VIDEO FRAME TRANSMISSION DURING A COMMUNICATION SESSION

(75) Inventor: Jouko Tenhunen, Helsinki (FI)

(73) Assignee: Nokia Corporation, Espoo (FI)

( * ) Notice: Subject to any disclaimer, the term of this patent is extended or adjusted under 35 U.S.C. 154(b) by 434 days.

(21) Appl. No.: 10/789,448

(22) Filed: Feb. 27, 2004

(65) Prior Publication Data

US 2005/0192052 A1 Sep. 1, 2005

(51) Int. Cl.
*G06F 13/00* (2006.01)
(52) U.S. Cl. .................... 709/227; 709/219; 709/231
(58) Field of Classification Search ............... 709/204, 709/206, 217, 219, 250
See application file for complete search history.

(56) References Cited

U.S. PATENT DOCUMENTS

| | | | |
|---|---|---|---|
| 6,922,568 B1* | 7/2005 | Nakamura | 455/462 |
| 7,058,356 B2* | 6/2006 | Slotznick | 455/3.05 |
| 7,139,014 B1* | 11/2006 | Kim et al. | 348/14.01 |
| 7,194,235 B2* | 3/2007 | Nykanen et al. | 455/3.01 |
| 2002/0078462 A1* | 6/2002 | Foster et al. | 725/87 |
| 2002/0186252 A1* | 12/2002 | Himmel et al. | 345/787 |
| 2003/0218682 A1* | 11/2003 | Lim et al. | 348/333.11 |
| 2004/0117820 A1* | 6/2004 | Thiemann et al. | 725/37 |
| 2005/0033821 A1* | 2/2005 | Shin et al. | 709/217 |
| 2006/0125927 A1* | 6/2006 | Watanabe | 348/211.1 |

* cited by examiner

*Primary Examiner*—Viet D. Vu
(74) *Attorney, Agent, or Firm*—Hollingsworth & Funk, LLC

(57) ABSTRACT

A method and apparatus allows keyhole frame images to be transmitted to a receiving terminal during a communication session. The keyhole frame is movable and resizable throughout the display of the hosting terminal, whereby the image captured by the keyhole frame is transmitted to the receiving terminal during the communication session. The transmitted image may be combined at the receiving terminal with voice or other transmissions from other independent sources to form an integrated communication session. Modifications to the image may be directed by the receiving terminal either through voice commands sent to the hosting terminal from the receiving terminal, or alternatively through cursor/pointing device commands actuated from the receiving terminal itself. All modifications effected on the keyhole frame image at the hosting terminal are viewed in real time at the receiving terminal.

19 Claims, 7 Drawing Sheets

METHOD AND APPARATUS FOR KEYHOLE VIDEO FRAME TRANSMISSION DURING A COMMUNICATION SESSION

FIELD OF THE INVENTION

This invention relates in general to communication sessions, and more particularly, to rich call communication sessions offering keyhole frame image exchange between the communication session participants.

BACKGROUND OF THE INVENTION

Over the last decade, there has been a merger of two of the most successful communications tools ever developed—mobile communications and the Internet. The Internet has provided access to many kinds of services, information, and content through one common interface. Mobile communications has provided the concept of being reachable at any time and with the ability to reach other people or services quickly. Combining the freedom of the Internet with the reachability and immediacy of mobile networks, the Mobile Internet has been born.

Service creation for the Mobile Internet is based on an open content format, e.g., eXtensible Markup Language (XML), and Internet Engineering Task Force (IETF) defined protocols, such as the Session Initiation Protocol (SIP). Service mobility through open content format provides accessibility of a consumer's personalized services through any access network or device, whereby service reachability through the open content format provides services that follow the consumer wherever he or she may go.

While services such as messaging and browsing continue to be important to today's Mobile Internet user, person to person communications will remain as one of the most important services offered by the Mobile Internet. As the Mobile Internet technology advances, communications will combine multiple media types and communication methods with presence and community information, not only to enhance person to person communication, but also to enhance multi-point to multi-point communication, i.e., conferencing. With the use of Internet Protocol (IP), for example, addition of rich media is facilitated through the use of standardized networking and signaling protocols.

A media enhanced call, i.e., rich call, may be defined as a voice or video conversation that is supported with concurrent access to an image, data, or other information during a single session. SIP will provide enabling technology for rich calls, where the Web and Mobile domains may be joined for true service mobility and access independence. SIP's support for rich calls will add "see what I see", or "keyhole" capability for consumers through a combination of voice, mail, Web browsing, instant messaging, voice over IP (VoIP), and other services. Although it is not necessary to employ VoIP or IP telephony service machinery for rich call servicing, it is expected that IP telephony and/or IP multimedia will emerge as the technology of choice for the rich call environment.

Today, keyhole processing has been introduced into browsing services, whereby the server that is hosting the visited Web site may offer content other than that provided by the extensible markup. Such content, for example, may include live video feeds from traffic cameras dispatched throughout the city where the consumer resides. In such an instance, however, a server to person topology exists, whereby a server within the network provides the video feed directly to the person that is currently visiting the Web site. Future keyhole processing within the Mobile Internet will not only involve such a server to person topology, but alternate multi-domain environments will also be involved in keyhole processing. The multi-domain environments will include, for example, a Personal Computer (PC) or other hardware platform involved with a mobile terminal during a person to person communication session, or conversely a Personal Digital Assistant (PDA) to mobile terminal communication session.

As person to person communications improve, versatility and consumer satisfaction continue to grow. Accordingly, conventional person to person communication sessions involving multi-domain environments continue to require refinement. One such area of improvement relates to communication sessions involving video data that may be required to be exchanged between the communication session participants.

Accordingly, there is a need for continued improvement in the communications industry for enablement of rich call sessions in a multi-domain environment.

SUMMARY OF THE INVENTION

To overcome limitations in the prior art, and to overcome other limitations that will become apparent upon reading and understanding the present specification, the present invention discloses a system and method that allows keyhole frame images to be transmitted from a hosting terminal to a receiving terminal during a communication session, where the keyhole frame images may be modified by the receiving terminal.

In accordance with one embodiment of the invention, a method of exchanging data between participants of a communication session comprises establishing a voice connection between participants of the communication session, activating a keyhole frame within a display of a hosting terminal that is in proximity to a first participant, establishing a stream connection between the first participant and a second participant, streaming image data contained within the keyhole frame from the hosting terminal to a mobile terminal proximately located to the second participant via the stream connection, and establishing data connections between ones of the participants of the communication session and the mobile terminal.

In accordance with another embodiment of the invention, a keyhole frame processing system comprises first and second mobile terminals wirelessly adapted to establish a voice connection between them and a hardware platform wirelessly coupled to the second mobile terminal and adapted to establish a data connection between the second mobile terminal and the hardware platform. The hardware platform comprises a display and a keyhole frame application adapted to place a keyhole frame anywhere within a viewable area of the display. The keyhole frame application is further adapted to transmit image data contained within the keyhole frame to the second mobile terminal via the data connection.

In accordance with another embodiment of the invention, a mobile terminal is wirelessly coupled to a network which includes a hardware platform capable of transmitting video content to the mobile terminal. The mobile terminal comprises a memory capable of storing at least a keyhole frame module and a processor coupled to the memory. The processor is configured by the keyhole frame module to enable projecting the video content to a display of the mobile terminal. The mobile terminal further comprises a transceiver that is configured to facilitate the image exchange with the hardware platform. The keyhole frame module is further adapted to generate edit commands to change the video content displayed by the mobile terminal.

In accordance with another embodiment of the invention, a computer-readable medium having instructions stored thereon which are executable by a mobile terminal for exchanging video content with a hardware platform performs steps comprising establishing a first connection with a second mobile terminal to provide voice communications between the mobile terminal and the second mobile terminal, establishing a second connection with the hardware platform, where the hardware platform is proximately located with the second mobile terminal. The steps further comprise receiving video data from the hardware platform via the second connection and providing commands to the hardware platform that affect the video data received from the hardware platform. The commands are provided via one of the first connection or second connection.

In accordance with another embodiment of the invention, a hardware platform comprises means for establishing first and second connections with a mobile terminal, means for exchanging voice communications with the mobile terminal via the first connection, means for generating video data contained within a keyhole frame, the keyhole frame being defined by keyhole frame parameters to lie within a display region of the hardware platform, and means for providing the video data to the mobile terminal via the second connection.

In accordance with another embodiment of the invention, a computer-readable medium having instructions stored thereon which are executable by a hardware platform performs steps comprising establishing first and second connections with a mobile terminal, exchanging voice communications with the mobile terminal via the first connection, generating video data contained within a keyhole frame, where the keyhole frame is defined by keyhole frame parameters to lie within a display region of the hardware platform. The steps further comprise providing the video data to the mobile terminal via the second connection, where external commands are received that change the keyhole frame parameters.

These and various other advantages and features of novelty which characterize the invention are pointed out with greater particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a system and method in accordance with the invention.

BRIEF DESCRIPTION OF THE DRAWINGS

The invention is described in connection with the embodiments illustrated in the following diagrams.

DETAILED DESCRIPTION OF THE INVENTION

Figure 1:
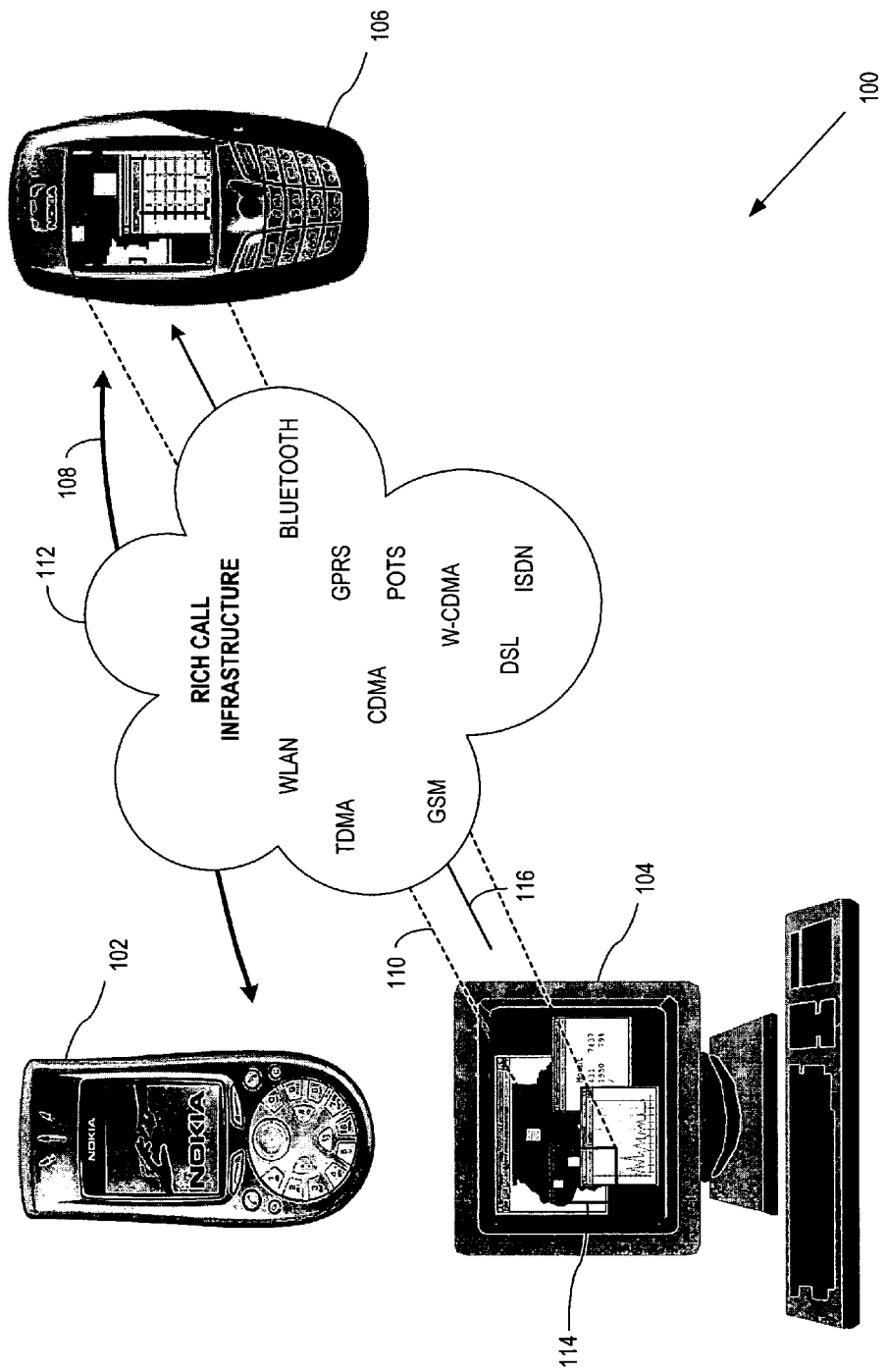
FIG. 1 illustrates a block diagram according to the principles of the present invention.

In the following description of the exemplary embodiment, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally, the present invention is directed to a method and apparatus allowing keyhole frame images to be transmitted to a receiving terminal during a communication session. The keyhole frame is movable and resizable throughout the display of the hosting terminal, whereby the image captured by the keyhole frame is transmitted to the receiving terminal during the communication session. Modifications to the image may be directed by the receiving terminal either through voice commands sent to the hosting terminal from the receiving terminal, or alternatively through cursor/pointing device commands actuated from the receiving terminal itself. All modifications effected on the keyhole frame image at the hosting terminal are viewed in real time at the receiving terminal.

A rich call is perceived to relate to a consumer's immediate, personal, person to person communication needs. Some of these needs can already be satisfied today with telephony services, such as the basic voice call, voice mail, and call forwarding services offered by carriers employing, for example, Global System for Mobile Communication (GSM) technologies. The key in a rich call, however, is the consumer experience: the value and potential of combining telephony with other elements to provide enriched services. Voice calls, for example, may evolve into rich calls, during which audio, video, image, or other data can be shared.

The present invention improves upon the current state of the art of person to person communication, through the activation of keyhole frame processing. In general, a keyhole frame may be activated by a user, whereby a portion of the display that lies within the keyhole frame may be captured for subsequent transfer/storage within the communication device being used, e.g., Personal Computer (PC), Personal Digital Assistant (PDA), mobile terminal, etc. The keyhole frame may be of any size and shape desired by the user and it may be negotiable depending on the terminal capabilities, e.g., screen size, at any time before, during, or after the communication session. Other person(s) in communication with the user may view whatever the user has selected to be captured by the keyhole frame. The keyhole frame may represent a portion of the user's display, or conversely, may represent any other file/application that the user wishes to share with the other persons involved in the communication session.

The shared keyhole frame may be shared through any number of wired network topologies such as Digital Subscriber Line (DSL), Plain Old Telephone Service (POTS), Integrated Services Digital Network (ISDN). Wireless cellular networks utilizing multiple access technologies such as, Time Division Multiple Access (TDMA), Code Division Multiple Access (CDMA), and GSM may also be employed to share the keyhole frame. Still further, proximity technologies like Bluetooth, Wireless Local Area Network (WLAN), InfraRed (IR) may also be used to facilitate keyhole frame exchange according to the present invention.

FIG. 1 illustrates rich call network 100 allowing versatile reachability and connectivity schemes to be employed by consumers to freely use services with whatever device best suits their communication needs—based on the consumer's relative time and position, independent of the particular access technology or network environment 112 being used at that moment. The use of visual content enables the present invention to offer many new services and applications such as: mobile interactive games; team collaboration; and business to customer service solutions.

Initiation of call 108 from mobile terminal 102 to mobile terminal 106 is performed by any one of a number of methods currently available. For example, the user of mobile terminal 102 may select the user of mobile terminal 106 from a buddy list or dynamic phone book, which includes presence and any other information that the user of mobile terminal 106 wants to publish about himself. The user of mobile terminal 102 may instead access mobile terminal 106 through Web page access of the user's name and number so that the user's context and location may be taken into account prior to call setup of call 108.

During call 108, the call participants may toggle between different media types, such that while the audio portion of call 108 is transpiring, live video or snapshots may be exchanged. The present invention further allows sharing of a user's display view, allowing, for example, the display or a portion of the display of PC 104 to be projected onto the display of mobile terminal 106, while call 108 is in process. In particular, keyhole frame 114 may be selected by the user of PC 104 to allow the user of mobile terminal 106 to see what the user of PC 104 wants him to see.

In order to illustrate an exemplary usage of rich call network 100, a scenario will now be explored whereby the user of mobile terminal 106 is a Chief Executive Officer (CEO) and the user of mobile terminal 102 is the secretary of the CEO. The secretary has prepared some material for a presentation that the CEO will be giving on a particular business trip, while the CEO is en route to the presentation venue. Call 108 is established between the secretary and the CEO to initiate a person to person communication session. The person to person communication session is then augmented by second call 116, initiated by the secretary between PC 104 and mobile terminal 106, to provide a conduit for delivery of streamed view 110 to the CEO.

In particular, streamed view 110 is the projection of the contents of keyhole frame 114 onto the display of mobile terminal 106. Thus, while the secretary and the CEO are conducting voice communication via call 108, the secretary may allow the CEO to see a portion, e.g., keyhole frame 114, of the display of PC 104 via call 116 to supplement their conversation. Thus, the CEO's rich call experience is improved in accordance with the present invention.

Resident within PC 104 is a frame application in accordance with the present invention, that allows a portion of the display of PC 104, e.g., 114, to be captured and subsequently streamed to mobile terminal 106, or any other terminal connected to rich call infrastructure 112. The size of keyhole frame 114 may have been previously optimized through the use of presence or capability information exchanged during the call setup of call 108 or 116, depending upon the ability of rich call infrastructure 112 to host negotiated capability information for call 116. Conversely, the use of profile information subscribed to by PC 104 in relation to the capabilities of mobile terminal 106 may be used to initially set the size of keyhole frame 114 in accordance with the display size of mobile terminal 106.

If the initial resolution of projection 110 of keyhole frame 114 is not adequate for the CEO's purposes, the CEO may make a verbal request via call 108 for the secretary to adjust the resolution of keyhole frame 114. In such an instance, the secretary may then either "zoom in" or "zoom out" in accordance with the CEO's needs. Alternatively, or additionally, if the CEO wishes to view a differently sized portion of the display of PC 104, then the secretary may simply adjust the size of keyhole frame 114 to match the request. In any event, a rendering application within PC 104, or alternately within rich call infrastructure 112, may then receive the adjusted size/resolution of keyhole frame 114 and conform the resulting video stream to the pre-negotiated display size of mobile terminal 106. Applications within PC 104 may also adapt to the size of keyhole frame 114 once it has been determined, such that visibility of the application may be optimized at the remote end, e.g., mobile terminal 106.

Once keyhole frame 114 has been adequately projected onto mobile terminal 106, the CEO may view the presentation materials produced by the secretary. Any updates to the presentation materials may then be communicated verbally via call 108 by the CEO for subsequent update by the secretary on PC 104. As each modification is being performed by the secretary, streamed view 110 is being projected onto the display of mobile terminal 106. In other words, as visual data within keyhole frame 114 changes, the display of mobile terminal 106 also changes to reflect the modifications made by the secretary, so that the CEO has real time review of the modifications being made. Keyhole frame 114 may also be arranged to follow the active cursor on the PC 104 screen. In such an instance, keyhole frame 114 is automatically centered around the active cursor, so that the CEO may experience a centered view of the modifications taking place on PC 104, thus obviating the need for the secretary to manually center keyhole frame 114 around the content being modified. Once all of the modifications have been implemented, the presentation is instantly in its final version, since no further review is required by the CEO.

In an alternate embodiment in accordance with the present invention, keyhole frame 114 may represent a file or application, such as a word processing or a presentation generation utility. In such an instance, the frame displayed by such a file or application becomes keyhole frame 114, whereby each keystroke and pointing device input performed by the secretary on keyhole frame 114 becomes visible to the CEO on the display of mobile terminal 106. Initially, the secretary is given control over any editing processes being performed on the file. However, the secretary may pass control over to the CEO, such that the CEO is given control over the editing process. In this case, although the file being edited is local to PC 104, the editing input is nevertheless being generated at mobile terminal 106. Thus, if the secretary does not understand the verbal modification instructions given via the voice call, the CEO may demonstrate his instructions visually by causing the visual content of keyhole frame 114 to be modified by cursor/pointing device actions performed on mobile terminal 106. In this way, the rich call communication session allows simultaneous modifications to the visual content of keyhole frame 114 by each member of the communication session (there may be more than just two), where only a single copy of the file being edited is required.

Figure 2:
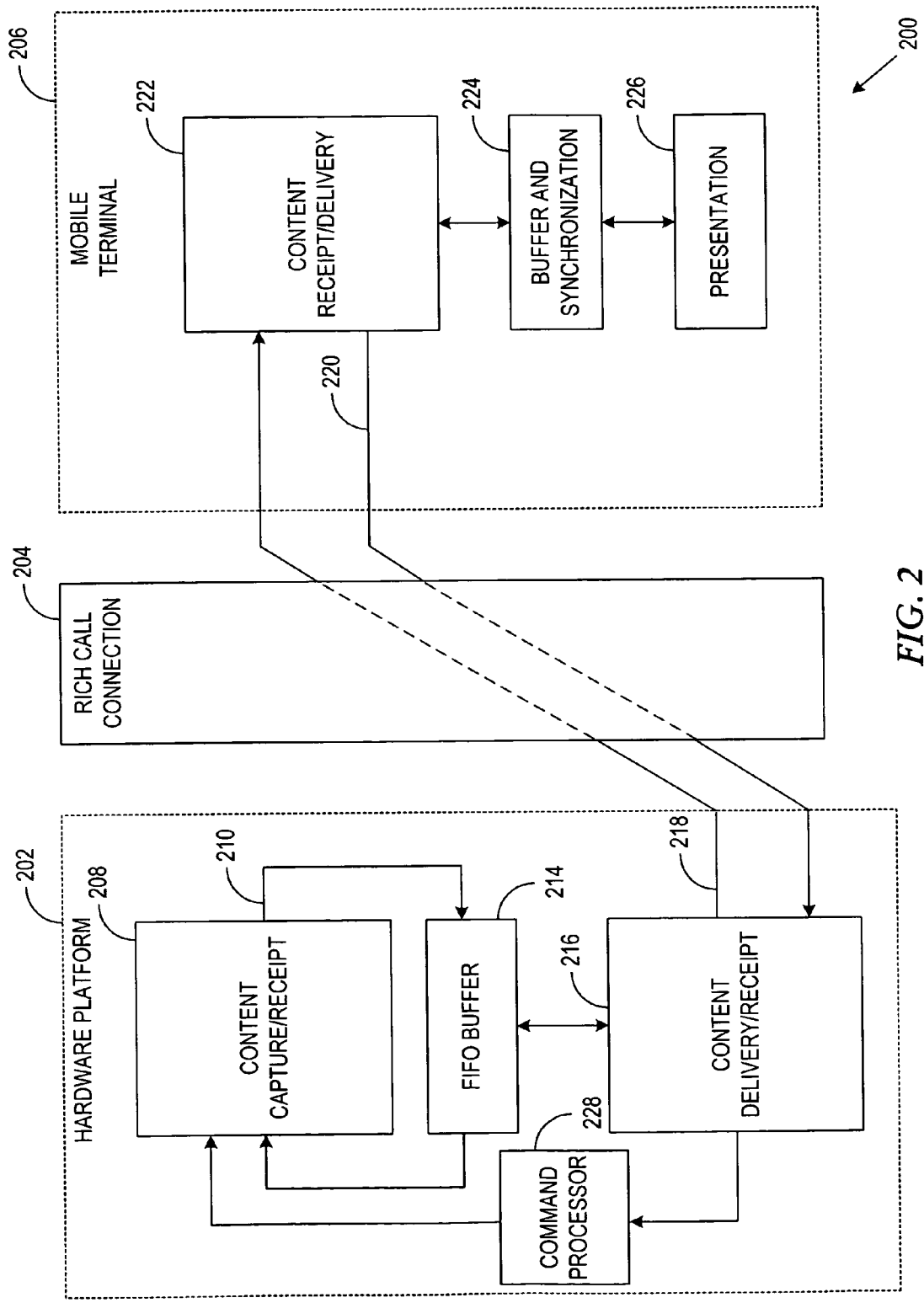
FIG. 2 illustrates an exemplary content exchange mechanism in accordance with the present invention.

FIG. 2 illustrates block diagram 200 of exemplary content exchange mechanisms utilized by mobile terminal 206 and hardware platform 202 during a rich call exchange in accordance with the present invention. In general, mobile terminal 206 and hardware platform 202 are arranged to exchange data using paths 218 and 220 via rich call connection 204. The nature of the data transfer may be of any type and rate that is supported by rich call connection 204, mobile terminal 206 and hardware platform 202. One of ordinary skill in the art will recognize that any data type may be supported by such an arrangement.

For purposes of exemplifying the present invention, block diagram 200 is discussed in terms of a content transport mechanism between mobile terminal 206 and hardware platform 202, whereby rich call connection 204 is utilized as the communication conduit between the two devices. Rich call connection 204 may represent a wired and/or a wireless connection. Wired implementations of rich call connection 204 may include, for example, POTS, DSL or ISDN, whereas other, non-telecommunications based wired implementations may simply use the Universal Serial Bus (USB), or FireWire, specifications, for example. Wireless, non-cellular implementations of rich call connection 204 may include WLAN, Bluetooth, Infrared, etc., whereas cellular implementations utilizing TDMA, CDMA, W-CDMA, GPRS, etc. may be used as required by the particular application.

In operation, hardware platform 202 may be a device having content capture/receipt capability 208 that is used for generation of keyhole frame 114 and its contents as illustrated in FIG. 1. Content capture/receipt 208 provides video data, whereby the images may be presented in still and/or video mode. In still mode, only a single image is transferred via path 210 to First-In First-Out (FIFO) buffer 214. In video mode, multiple images arranged in back to back frame sequence are transferred to FIFO buffer 214 at a rate that conforms with the bandwidth requirements of rich call connection 204. FIFO buffer 214 buffers the content blocks, while content delivery/receipt 218 prepares for their subsequent transfer to mobile terminal 206 via path 218 through rich call connection 204. Path 220 is used by content receipt/delivery 222 to acknowledge receipt of the images transmitted from content delivery 216 via rich call connection 204 as well as to provide edit commands associated with the received video content as discussed below. Buffer and synchronization block 224 is used to provide the proper frame alignment and playback speed as required by presentation 226. Presentation 226 represents any Application Programming Interface (API) that is executing on mobile terminal 206 including image processing software required by mobile terminal 206 for subsequent display.

The images transferred via rich call path 204 may be formatted and rendered in accordance with the capabilities of the display (not shown) of mobile terminal 206. Additionally, the images may be transferred in any one of a number of video formats to include Moving Pictures Expert Group (MPEG), MPEG version 4 (MPEG-4), Joint Photographic Experts Group (JPEG), to name only a few. In addition, vector graphics files may be transmitted, where creation of digital images is facilitated through a sequence of commands or mathematical statements that place lines and shapes in a given two-dimensional or three-dimensional space. In vector graphics, the file that results is created and saved as a sequence of vector statements. For example, instead of containing a bit in the file for each bit of a line drawing, a vector graphic file describes a series of points to be connected. Alternatively, the vector graphics file may be converted to a raster graphics image by content delivery/receipt 216 prior to transmission, so as to increase portability between systems. Additionally, animation images are also usually created as vector graphic files, using content creation products that allow creation of 2-D and 3-D animations that may be sent to content receipt/delivery 222 as a vector file and then rasterized "on the fly" as they arrive by presentation 226.

Control data may also be transferred via rich call connection 204 between mobile terminal 206 and hardware platform 202. In particular, as a result of the data displayed by presentation 226 on the display (not shown) of mobile terminal 206, the user of mobile terminal 206 may wish to make changes to the data displayed. Since only the graphical representations of the data contained within content capture/receipt 208 are presented by presentation 226, commands may be sent from content receipt/delivery 222 to command processor 228 to effect changes on the data that is stored within content capture/receipt 208.

Such is the case, for example, when the data presented by presentation 226 is the contents of a word processing file contained within content capture/receipt 208. If modifications are to made by mobile terminal 206, then authorization to make such modifications is granted by hardware platform 202 via rich call connection 204. Accordingly, data modification commands are transmitted by mobile terminal 206 to hardware platform 202 via path 220 to effect such changes to the data. In response, the updated graphical representations of the edited data are provided to mobile terminal 206 from hardware platform 202 via path 218.

In an alternate embodiment, changes to the data stored within content capture/receipt 208 may be effected by hardware platform 202 itself, where the graphical representations of the changes to the data are immediately provided to mobile terminal 206 via path 218 for subsequent display by presentation 226. In this way, as modifications to the data are being made at hardware platform 202, the user of mobile terminal 206 is immediately made aware of them.

Figure 3:
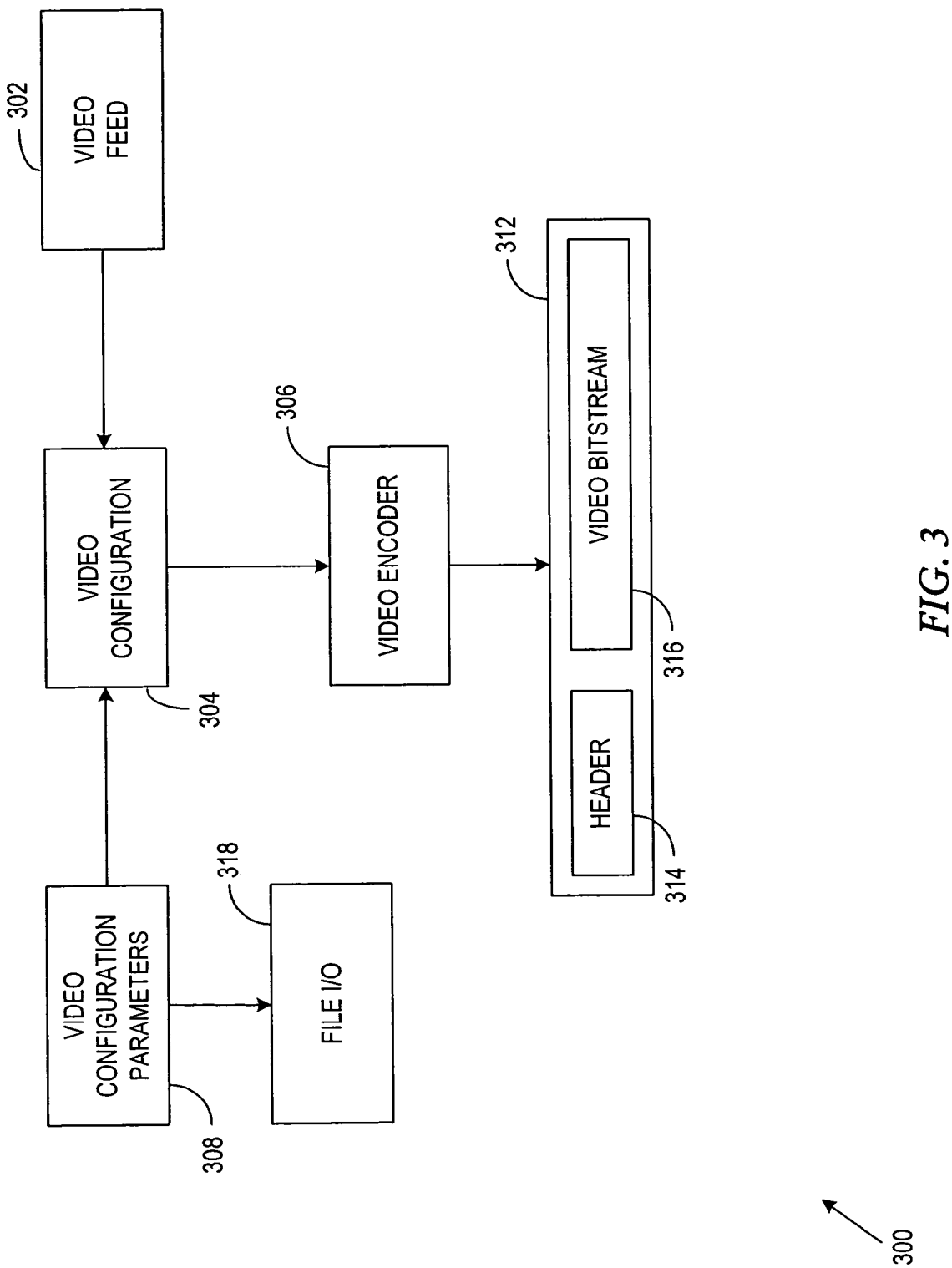
FIG. 3 illustrates an exemplary block diagram of the content capture/receipt mechanism of FIG. 2.

FIG. 3 illustrates exemplary block diagram 300 exhibiting some of the key elements provided by content capture/receipt 208 of FIG. 2 as they relate to the principles of the present invention. Video feed 302 provides a series of images to video configuration block 304 representing, for example, the video data presented to the display of PC 104. Video configuration parameters 308 are received by video configuration 304 to define the configuration parameters used for the generation of keyhole frame 114 such as: aspect ratio, position, portion of video feed 302 to be represented within keyhole frame 114, etc.

Video configuration parameters 308 may also represent cursor and pointing device control placement parameters provided by mobile terminal 106 after PC 104 has granted modification rights to mobile terminal 106. In such an instance, for example, keyhole frame 114 contains content to be edited by mobile terminal 106. Any control input generated by mobile terminal 106 that is construed by video configuration parameters 308 as being file edit commands, are provided to file Input/Output (I/O) 318, so that the appropriate file content may be updated and thus incorporated by video feed 302.

Video configuration parameters 308 may also represent cursor and pointing device control placement parameters that are provided by PC 104. In such an instance, for example, keyhole frame 114 contains content to be edited by PC 104, based on verbal commands received from mobile terminal 106 via call 108. Any control input generated by PC 104 that is construed by video configuration parameters 308 as being file edit commands, are provided to file Input/Output (I/O) 318, so that the appropriate file content may be updated. Accordingly, any changes to the file currently being displayed by keyhole frame 114, whether they be locally generated by PC 104 or remotely generated by mobile terminal 106, are immediately reflected in keyhole frame 114.

Video encoder 306 receives the video content represented by keyhole frame 114 at a configurable frame rate. Video encoder 306 then implements video compression methods that exploit redundant and perceptually irrelevant parts of the video frames received from video configuration 304. The redundancy can be categorized into spatial, temporal, and spectral components; where spatial redundancy relates to correlation between neighboring pixels; temporal redundancy relates to objects likely to appear in present frames that were there in past frames; and spectral redundancy addresses the correlation between the different color components of the same image. Video encoder 306 achieves video compression by generating motion compensation data, which describes the motion between the current and previous image of two consecutive video frames. Video encoder 306 may seek to establish a constant bit rate for video bit stream 316, in which case video encoder 306 controls the frame rate as well as the quality of images contained within video frame 312. Video encoder 306 groups video bit stream 316 and header 314 into video frame 312 and then streams video frame 312, and subsequently formed video frames, to mobile terminal 106 via call 116, where header 314 provides specific information about the file format such as video coding type, length of frame, frame identifier, etc.

Video encoder 306 may implement a video COder/DECoder (CODEC) algorithm defined by ITU-T H.263, which is an established CODEC scheme used in various multimedia services. H.263 provides a wide toolbox of various encoding tools and coding complexities for different purposes. A definition of the tools to be used and the allowed complexity of the mode are defined in CODEC profiles and levels, such as Profile 0, Level 10, also known as the H.263 baseline, has been defined as a mandatory video CODEC. Video encoder 306 may also support decoding of video bit-stream content conforming to MPEG-4 Visual Simple Profile, Level 0. Other proprietary video coding formats, such as RealVideo 7 and RealVideo 8, may be used that are recognized by the RealOne Player utility.

Figure 4:
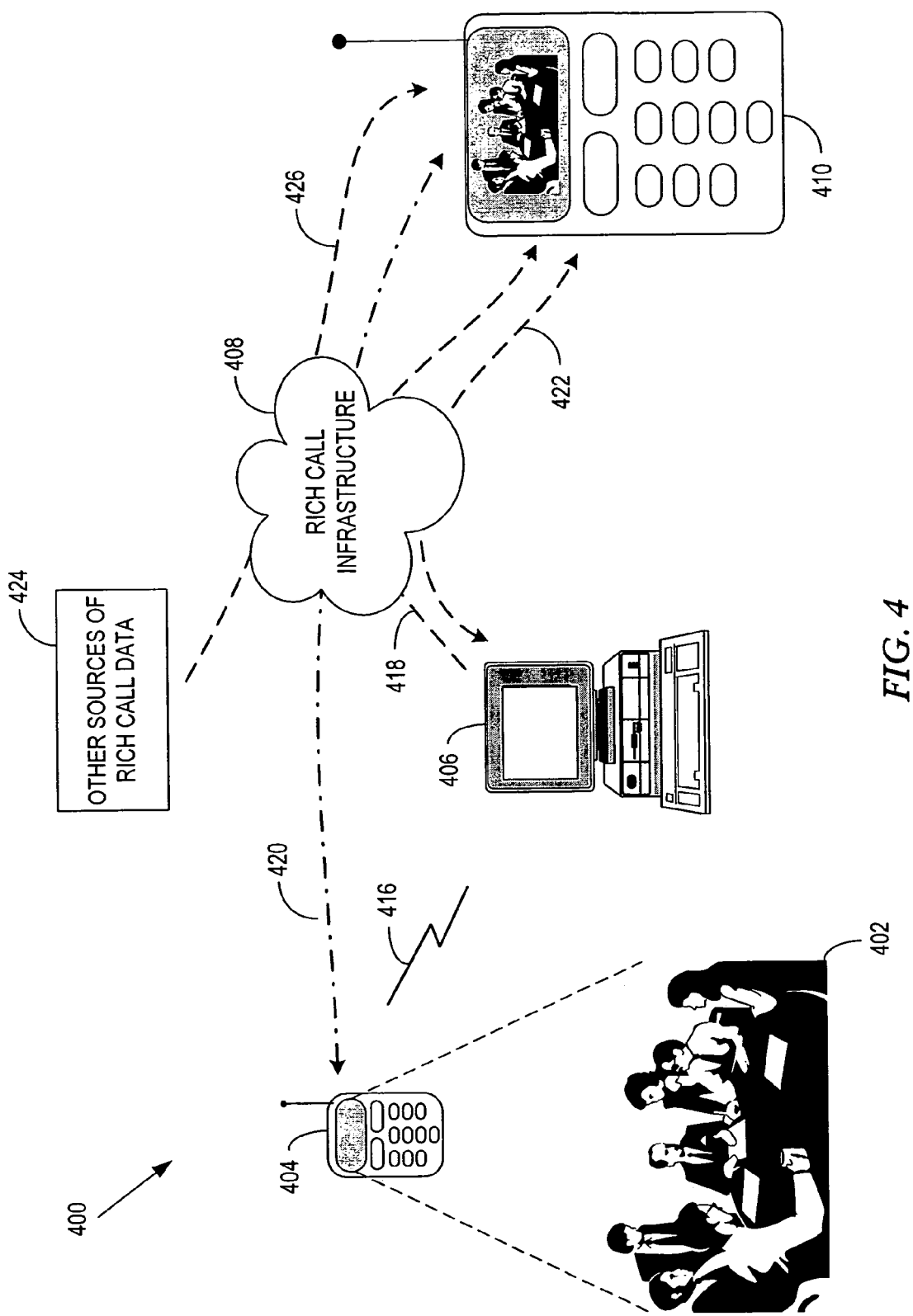
FIG. 4 illustrates an exemplary video conferencing scenario in accordance with the present invention.

FIG. 4 represents an enhanced video conferencing scenario 400 in accordance with the principles of the present invention, whereby the parties of meeting group 402 are participating in a meeting that the user of mobile terminal 410 is unable to attend due to prior travel commitments. Meeting group 402 and the user of mobile terminal 410 are spatially removed from one another, such as may be the case when a corporation has a number of production and engineering facilities that are geographically located across the globe from one another. In a particular case, for example, meeting group 402 may represent a group of management personnel located within the United States, who have assembled to exchange ideas with a senior production manager, i.e., the user of mobile terminal 410, who has traveled to a production facility in Finland.

In such an example, meeting group 402 and the senior production manager are not equipped with standard video conferencing equipment, but are equipped with imaging capable mobile terminals 404 and 410. In addition, image processing capable PC 406 is provided in proximity to meeting group 402. PC 406 and mobile terminal 404 are also equipped with proximity connection capability to facilitate communication via link 416. Proximity link 416 may be represented by a Bluetooth, WLAN, IR, or other proximity communication link as required by the particular application.

PC 406 and mobile terminal 410 are interconnected through rich call infrastructure 408 via path 418. PC 406 is equipped with a keyhole framing application as discussed above in relation to FIGS. 1-3. Such a keyhole framing application allows video data to be exchanged between PC 406 and mobile terminal 410, such that the images captured by mobile terminal 404 and subsequently transferred to PC 406 via Bluetooth connection 316 may be streamed to mobile terminal 410 via rich call path 418.

In order to ultimately create the virtual meeting, voice path 420 is created as a call from mobile terminal 404 to mobile terminal 410. A user of mobile terminal 404, for example, may invoke his buddy list in order to locate the identification number associated with mobile terminal 410. Once located, a voice call is initiated by mobile terminal 404 to mobile terminal 410 to establish voice connection 420. Once a connection is established, a second call is placed by PC 406 to mobile terminal 410 to establish streaming path 418. PC 406 is executing the keyhole framing application which has been configured to: capture imaging data received from mobile terminal 404 via proximity connection 416; format/render the data in accordance with capabilities associated with mobile terminal 410; and stream the rendered data to mobile terminal 410 for subsequent display. Once communication paths 420 and 418 have been constructed, the virtual video conference may commence as planned.

A third communication path 422 may then be established via rich call infrastructure 408, such that a second video stream may be established between PC 406 and mobile terminal 410. Communication path 422 is configured to allow files to be shared between meeting group 402 and the senior production manager, as discussed in relation to FIGS. 1-3 above, in order to facilitate the video conference. As such, any file that may be communicated between PC 406 and mobile terminal 410 may be simultaneously viewed by meeting group 402 via PC 406 and by the senior production manager via the display of mobile terminal 410. Thus, the senior production manager is actively involved with the virtual meeting through the combination of voice call 420 and video streams 418 and 422, whereby video streams 418 and 422 are selectively toggled onto the display of mobile terminal 410 by using keypad, pointing device, or voice commands from mobile terminal 410. The senior production manager may then communicate edit commands associated with the shared file to meeting group 402 via call 420 for subsequent input by meeting group 402. Alternatively, the senior production manager may insert his own edit commands into the shared file directly from mobile terminal 410. In either case, the result of the edit commands are simultaneously viewed by meeting group 402 via the display of PC 406 and viewed by the senior production manager via the display of mobile terminal 410 in accordance with the present invention.

It should be noted that other sources of rich call data 424 may be exchanged with mobile terminal 410, while mobile terminal 410 interacts with calls 418-422. Other meeting groups, for example, located in different locations than meeting group 402 may also provide voice/data to mobile terminal 410 to supplement the virtual meeting. In such an instance, mobile terminal 410 is able to simultaneously receive all voice communications in full duplex mode, while maintaining the ability to toggle between multiple video feeds 418, 422, and 426.

Figure 5:
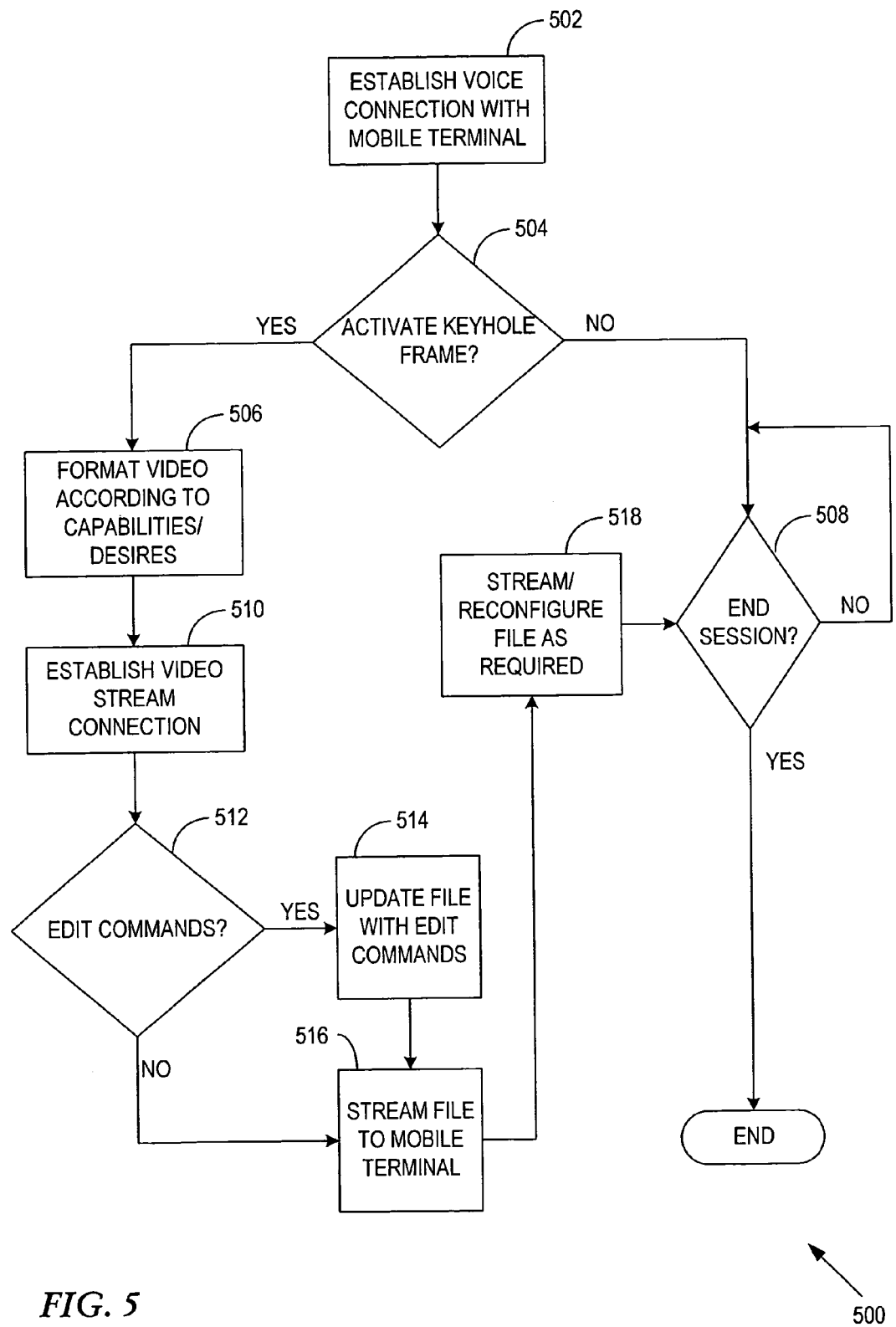
FIG. 5 illustrates an exemplary flow chart of a method in accordance with the present invention.

Flow diagram 500 of FIG. 5 illustrates an exemplary method in accordance with the principles of the present invention. In step 502, a voice connection is established, as discussed above in relation to FIGS. 1-4, between a hardware platform and a mobile terminal. In step 504, the desirability to activate a keyhole frame is determined by the hardware platform. If a keyhole frame is desired, then a user of the hardware platform, e.g., PC, PDA, or other computing device, formats the frame size, resolution, etc. to conform with the capabilities/desires of the mobile terminal as in step 506. A video stream connection is then established in step 510.

Edit commands, from either the mobile terminal or the hardware platform, are then accepted in step 512 and the file is then updated as in step 514 in accordance with the edit commands. In either case, the file is streamed to the mobile terminal as in step 516 and displayed. As long as the keyhole frame is active, it will continue to be streamed to the mobile terminal as in step 518, so that the user of the mobile terminal is kept informed as to the content represented by the keyhole frame. During the active keyhole frame session, reconfiguration events may take place that affect the size/resolution of the keyhole frame. The reconfiguration events may be: automatically generated by the keyhole frame application executing within the hardware platform; manually generated by an operator at the hardware platform; or provided by the user at the mobile terminal via voice or electronic reconfiguration commands. Once a termination of the session has been generated by either of the hardware platform or mobile terminal, the session is then ended as in step 508.

It should be noted that while the recipient terminal of the streamed video has been exemplified as a mobile terminal, those of ordinary skill in the art will recognize that any terminal capable of displayed graphical data may be used as the recipient terminal. That is to say that PC, PDAs, laptop computers, servers, etc. may be used to receive streamed video representative of keyhole frames in accordance with the present invention.

Figure 6:
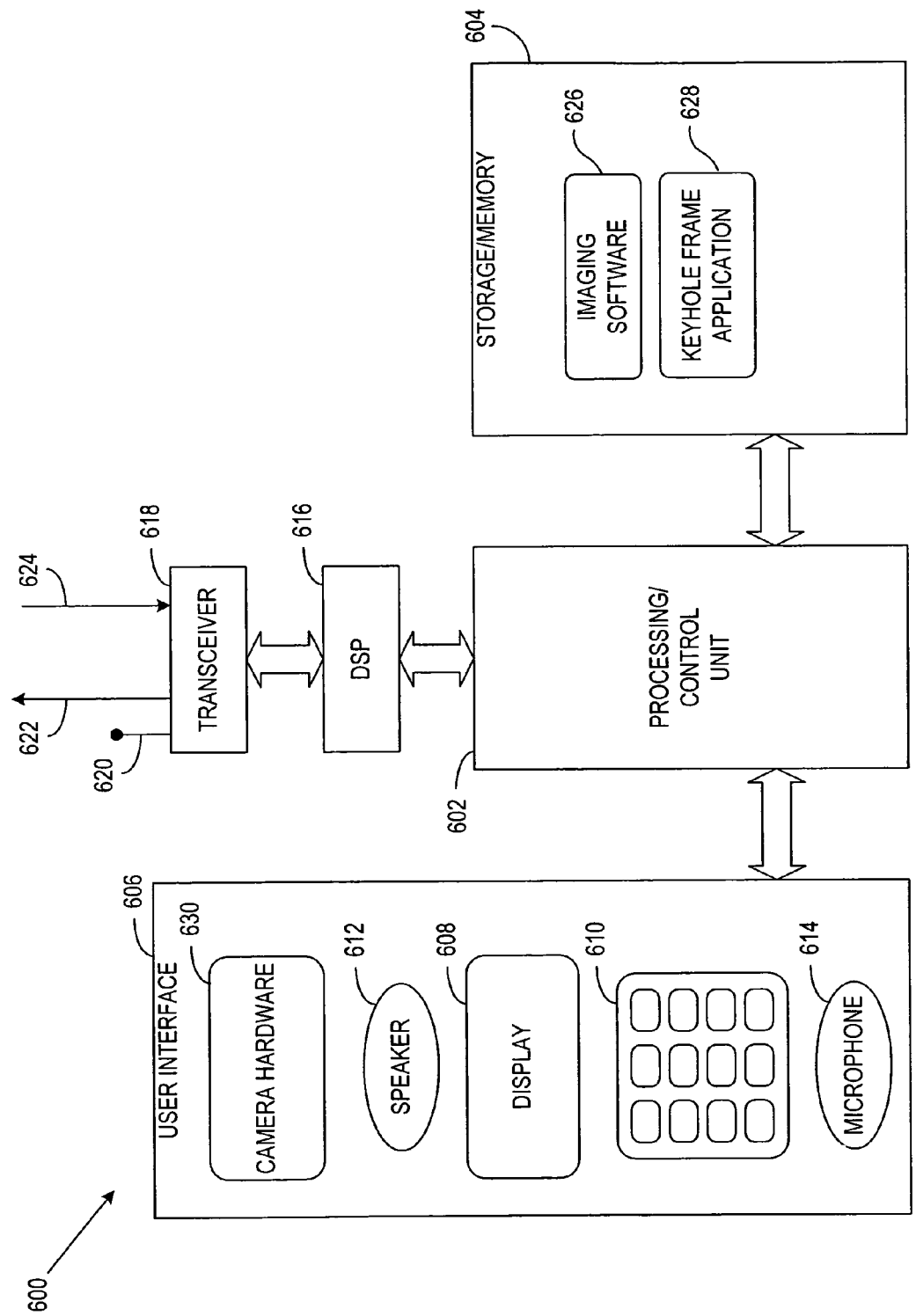
FIG. 6 illustrates a representative mobile computing arrangement suitable for displaying/modifying image data transmitted by a hardware platform in accordance with the present invention.

The invention is a modular invention, whereby processing functions within either a mobile terminal or a hardware platform may be utilized to implement the present invention. The mobile terminals may be any type of wireless device, such as wireless/cellular telephones, personal digital assistants (PDAs), or other wireless handsets, as well as portable computing devices capable of wireless communication. These landline and mobile devices utilize computing circuitry and software to control and manage the conventional device activity as well as the functionality provided by the present invention. Hardware, firmware, software or a combination thereof may be used to perform the various imaging transfer functions described herein. An example of a representative mobile terminal computing system capable of carrying out operations in accordance with the invention is illustrated in FIG. 6. Those skilled in the art will appreciate that the exemplary mobile computing environment 600 is merely representative of general functions that may be associated with such mobile devices, and also that landline computing systems similarly include computing circuitry to perform such operations.

The exemplary mobile computing arrangement 600 suitable for image data transfer/receipt functions in accordance with the present invention may be associated with a number of different types of wireless devices. The representative mobile computing arrangement 600 includes a processing/control unit 602, such as a microprocessor, reduced instruction set computer (RISC), or other central processing module. The processing unit 602 need not be a single device, and may include one or more processors. For example, the processing unit may include a master processor and associated slave processors coupled to communicate with the master processor.

The processing unit 602 controls the basic functions of the mobile terminal, and also those functions associated with the present invention as dictated by camera hardware 630 and imaging software module 626/keyhole frame application 628 available in the program storage/memory 604. Thus, the processing unit 602 is capable of facilitating image capture and keyhole framing functions associated with the present invention, whereby images received by keyhole frame application 626 from a remote hardware platform, may be processed in accordance with the present invention. The program storage/memory 604 may also include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc.

In one embodiment of the invention, the program modules associated with the storage/memory 604 are stored in non-volatile electrically-erasable, programmable ROM (EEPROM), flash ROM, etc. so that the information is not lost upon power down of the mobile terminal. The relevant software for carrying out conventional mobile terminal operations and operations in accordance with the present invention may also be transmitted to the mobile computing arrangement 600 via data signals, such as being downloaded electronically via one or more networks, such as the Internet and an intermediate wireless network(s).

The processor 602 is also coupled to user-interface elements 606 associated with the mobile terminal. The user-interface 606 of the mobile terminal may include, for example, a display 608 such as a liquid crystal display, a keypad 610, speaker 612, camera hardware 630, and microphone 614. These and other user-interface components are coupled to the processor 602 as is known in the art. Other user-interface mechanisms may be employed, such as voice commands, switches, touch pad/screen, graphical user interface using a pointing device, trackball, joystick, or any other user interface mechanism.

The mobile computing arrangement 600 also includes conventional circuitry for performing wireless transmissions. A digital signal processor (DSP) 616 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 618, generally coupled to an antenna 620, transmits the outgoing radio signals 622 and receives the incoming radio signals 624 associated with the wireless device.

The mobile computing arrangement 600 of FIG. 6 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a keyhole image processing system and method in accordance with the present invention.

Figure 7:
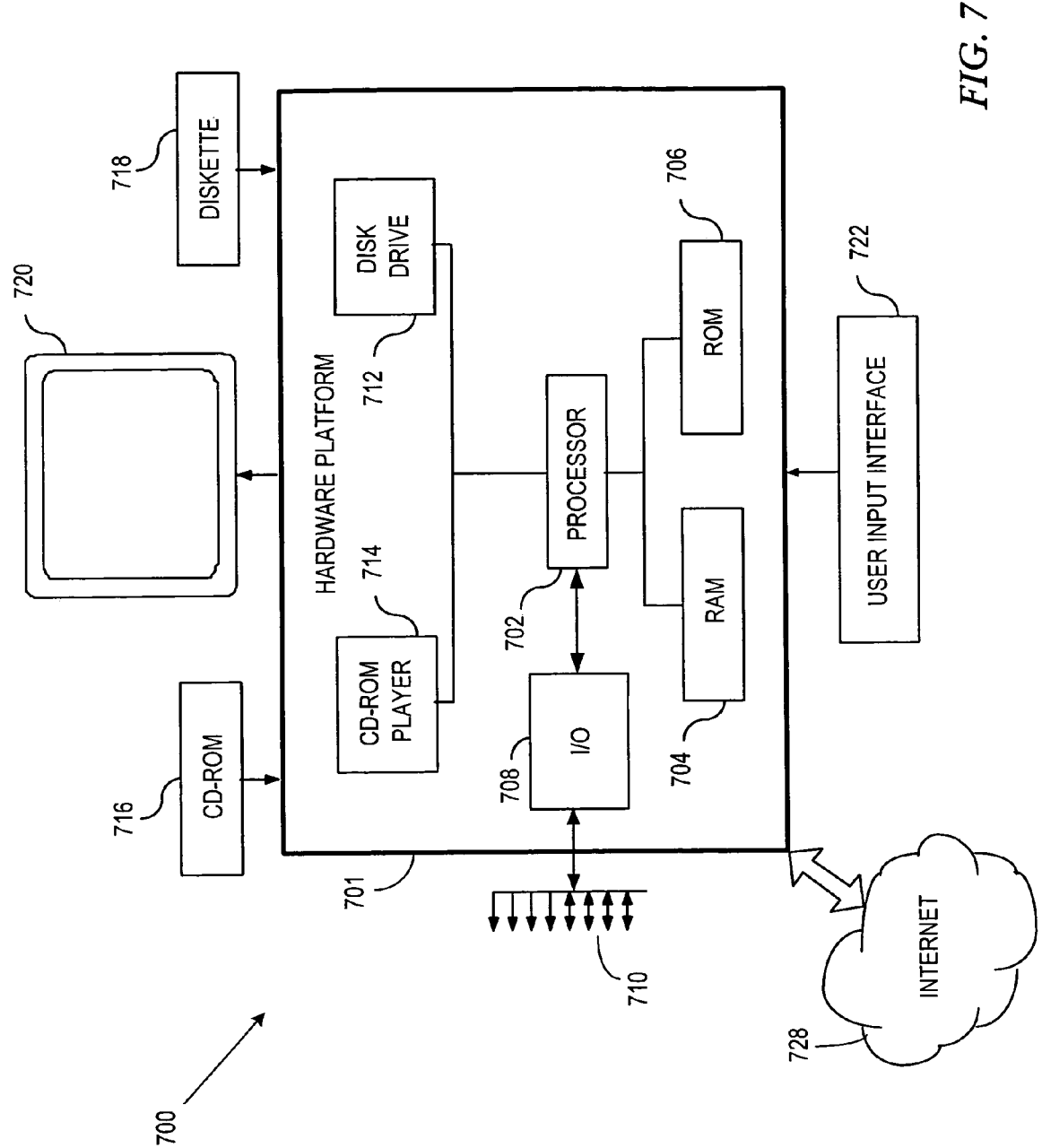
FIG. 7 is a representative computing system capable of carrying out image processing functions according to the present invention.

The hardware platforms or other systems for providing keyhole image processing functions in connection with the present invention may be any type of computing device capable of processing and communicating digital information. The hardware platforms utilize computing systems to control and manage the image processing activity. An example of a representative computing system capable of carrying out operations in accordance with the invention is illustrated in FIG. 7. Hardware, firmware, software or a combination thereof may be used to perform the various keyhole image processing functions and operations described herein. The computing structure 700 of FIG. 7 is an example computing structure that can be used in connection with such a hardware platform.

The example computing arrangement 700 suitable for performing the image processing activity in accordance with the present invention includes hardware platform 701, which includes a central processor (CPU) 702 coupled to random access memory (RAM) 704 and read-only memory (ROM) 706. The ROM 706 may also be other types of storage media to store programs, such as programmable ROM (PROM), erasable PROM (EPROM), etc. The processor 702 may communicate with other internal and external components through input/output (I/O) circuitry 708 and bussing 710, to provide control signals and the like. For example, image data transmitted by I/O connections 708 or Internet connection 728 may be processed in accordance with the present invention. External data storage devices, such as presence or profile servers, may be coupled to I/O circuitry 708 to facilitate imaging functions according to the present invention. Alternatively, such databases may be locally stored in the storage/memory of hardware platform 701, or otherwise accessible via a local network or networks having a more extensive reach such as the Internet 728. The processor 702 carries out a variety of functions as is known in the art, as dictated by software and/or firmware instructions.

Hardware platform 701 may also include one or more data storage devices, including hard and floppy disk drives 712, CD-ROM drives 714, and other hardware capable of reading and/or storing information such as DVD, etc. In one embodiment, software for carrying out the image processing and image transfer operations in accordance with the present invention may be stored and distributed on a CD-ROM 716, diskette 718 or other form of media capable of portably storing information. These storage media may be inserted into, and read by, devices such as the CD-ROM drive 714, the disk drive 712, etc. The software may also be transmitted to hardware platform 701 via data signals, such as being downloaded electronically via a network, such as the Internet. Hardware platform 701 is coupled to a display 720, which may be any type of known display or presentation screen, such as LCD displays, plasma display, cathode ray tubes (CRT), etc. A user input interface 722 is provided, including one or more user interface mechanisms such as a mouse, keyboard, microphone, touch pad, touch screen, voice-recognition system, etc.

The hardware platform 701 may be coupled to other computing devices, such as the landline and/or wireless terminals via a network. The server may be part of a larger network configuration as in a global area network (GAN) such as the Internet 728, which allows ultimate connection to the various landline and/or mobile client/watcher devices.

The foregoing description of the various embodiments of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with this detailed description, but rather determined from the claims appended hereto.

What is claimed is:

1. A method of exchanging data between participants of a communication session, comprising:
    establishing a voice connection between participants of the communication session;
    activating a keyhole frame within a display of a hosting terminal that is in proximity to a first participant, the keyhole frame representing a user-specified dimensional subset of what is displayed via the hosting terminal display;
    establishing a stream connection between the first participant and a second participant;
    streaming image data contained within the keyhole frame from the hosting terminal to a mobile terminal proximately located to the second participant via the stream connection; and
    establishing data connections between ones of the participants of the communication session and the mobile terminal.

2. The method according to claim 1, wherein activating the keyhole frame comprises defining an area within the display of the hosting terminal to represent the keyhole frame.

3. The method according to claim 2, wherein activating the keyhole frame further comprises positioning the keyhole frame within length and width constraints of the display of the hosting terminal.

4. The method according to claim 3, wherein positioning the keyhole frame comprises centering the keyhole frame around an active cursor of the hosting terminal.

5. The method according to claim 3, further comprising modifying the keyhole frame after activation of the keyhole frame.

6. The method according to claim 5, wherein modifying the keyhole frame comprises issuing modification commands from the mobile terminal to change the contents of the keyhole frame.

7. The method according to claim 6, wherein issuing modification commands comprises sending verbal commands from the second participant to the first participant via the voice connection, wherein the first participant modifies the keyhole frame in response to the verbal commands.

8. The method according to claim 6, wherein issuing modification commands comprises sending cursor control commands from the mobile terminal to the hosting terminal, wherein the first participant has previously granted modification rights to the second participant.

9. The method according to claim 5, wherein modifications made to the contents of the keyhole frame are reflected in the image data streamed from the hosting terminal to the mobile terminal.

10. A keyhole frame processing system, comprising:
    first and second mobile terminals wirelessly adapted to establish a voice connection between them; and a hardware platform wirelessly coupled to the second mobile terminal and adapted to establish a data connection between the second mobile terminal and the hardware platform, the hardware platform comprising:
- a display; and
- a keyhole frame application adapted to place a keyhole frame anywhere within a viewable area of the display and further adapted to transmit image data contained within the keyhole frame to the second mobile tenninal via the data connection.

11. The keyhole frame processing system according to claim 10, wherein the second mobile terminal transmits edit commands to the hardware platform affecting the image data contained within the keyhole frame.

12. The keyhole frame processing system according to claim 11, wherein the edit commands comprise voice commands transmitted from the second mobile terminal to the first mobile terminal via the voice connection.

13. The keyhole frame processing system according to claim 11, wherein the edit commands comprise cursor commands transmitted from the second mobile terminal to the hardware platform via the data connection.

14. The keyhole frame processing system according to claim 10, wherein the image data is reflected to a display of the second mobile terminal.

15. The keyhole frame processing system according to claim 11, wherein the image data affected by the edit commands is reflected to a display of the second mobile terminal.

16. A mobile terminal comprising:
- a memory capable of storing at least a keyhole frame module;
- a processor coupled to the memory and configured by the keyhole frame module to enable user designation of a dimensional portion of that which is presented via a display of the mobile terminal, and to enable projection of video content within that dimensional portion to the display of the mobile terminal; and
- a transceiver configured to facilitate a video content exchange with a hardware platform capable of transmitting the dimensional portion of the video content, wherein the keyhole frame module is further adapted to generate edit commands to change the video content displayed by the mobile terminal.

17. The mobile terminal according to claim 16, wherein the transceiver is further configured to transmit the edit commands over a voice channel.

18. The mobile terminal according to claim 16, wherein the transceiver is further configured to transmit the edit commands over a data channel.

19. A computer-readable medium having instructions stored thereon which are executable by a mobile terminal for performing steps comprising:
- establishing a voice connection between participants of a communication session;
- activating a keyhole frame within a display of a hosting terminal that is in proximity to a first participant, the keyhole frame representing a user-specified dimensional subset of what is displayed via the hosting terminal display;
- establishing a stream connection between the first participant and a second participant;
- streaming image data contained within the keyhole frame from the hosting terminal to the mobile terminal proximately located to the second participant via the stream connection; and
- establishing data connections between ones of the participants of the communication session and the mobile terminal.

\* \* \* \* \*

UNITED STATES PATENT AND TRADEMARK OFFICE
CERTIFICATE OF CORRECTION

| | | |
|---|---|---|
| PATENT NO. | : 7,398,316 B2 | Page 1 of 1 |
| APPLICATION NO. | : 10/789448 | |
| DATED | : July 8, 2008 | |
| INVENTOR(S) | : Jouko Tenhunen | |

It is certified that error appears in the above-identified patent and that said Letters Patent is hereby corrected as shown below:

Column 15, Claim 10, line 9-10: "tenni-nal" should be --terminal--.

Signed and Sealed this

Sixteenth Day of September, 2008

JON W. DUDAS
*Director of the United States Patent and Trademark Office*